No. 760,456. PATENTED MAY 24, 1904.
G. W. KING, H. J. BARNHART & C. B. KING.
STEAM SHOVEL.
APPLICATION FILED SEPT. 29, 1902.
NO MODEL. 7 SHEETS—SHEET 1.
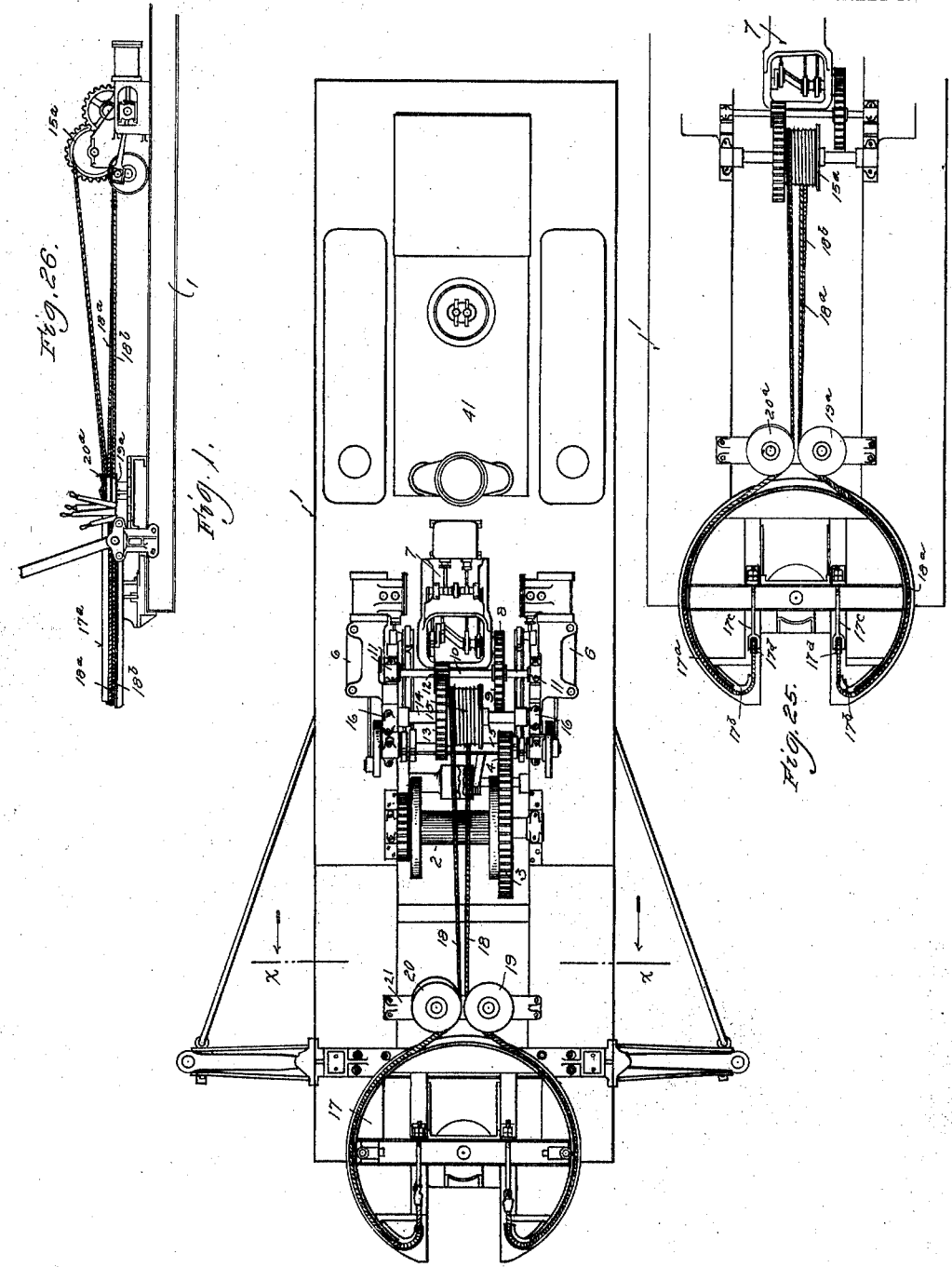
WITNESSES:
J. C. Dawley
Will O'Laughlen
INVENTORS,
GEORGE W. KING,
HARRY J. BARNHART AND
CHARLES B. KING.
BY
H. A. Toulmin
ATTORNEY.

No. 760,456. PATENTED MAY 24, 1904.
G. W. KING, H. J. BARNHART & C. B. KING.
STEAM SHOVEL.
APPLICATION FILED SEPT. 29, 1902.
NO MODEL. 7 SHEETS—SHEET 2.
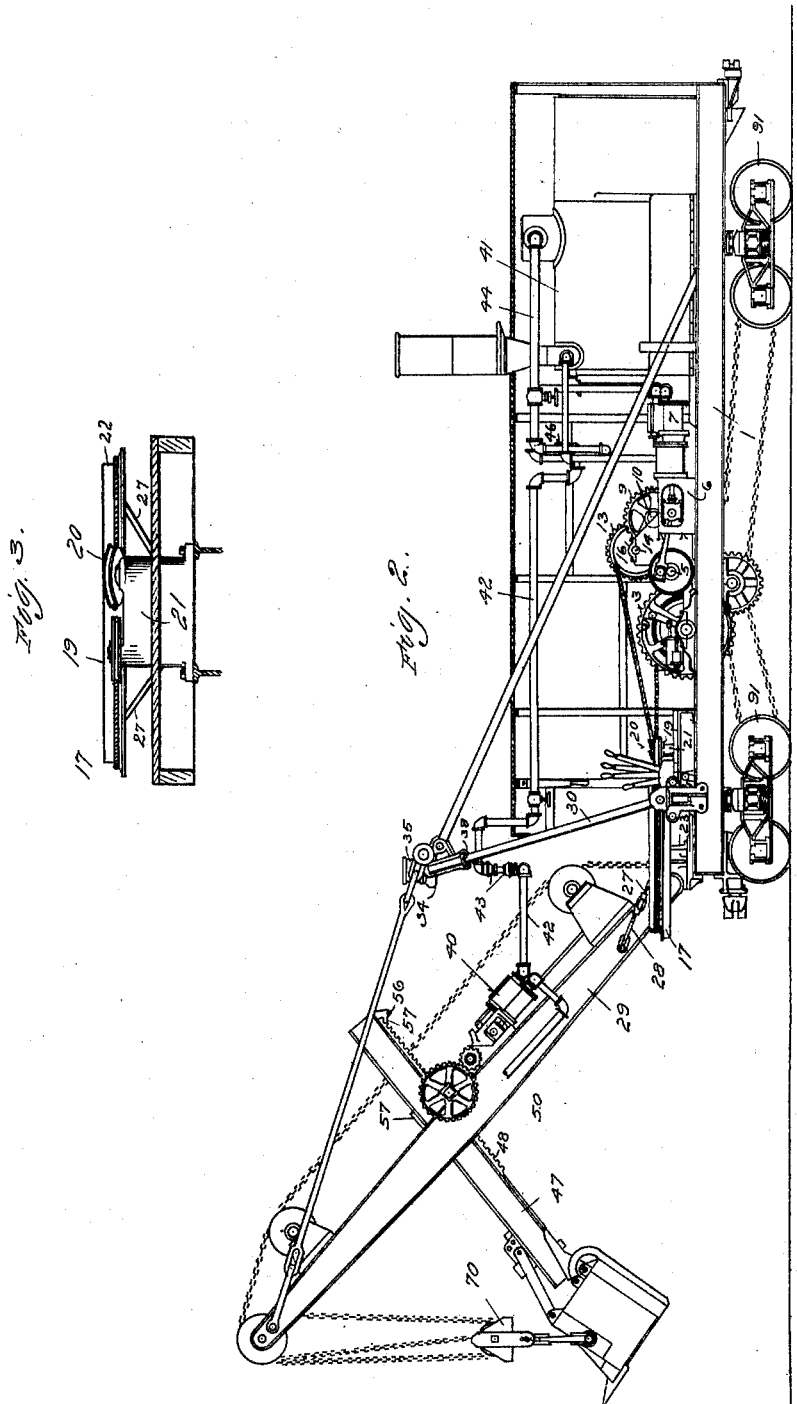
WITNESSES:
J. C. Dawley
Will O'Laughlin
INVENTORS.
GEORGE W. KING,
HARRY J. BARNHART
AND
CHARLES B. KING.
By
ATTORNEY.

No. 760,456. PATENTED MAY 24, 1904.
G. W. KING, H. J. BARNHART & C. B. KING.
STEAM SHOVEL.
APPLICATION FILED SEPT. 29, 1902.
NO MODEL. 7 SHEETS—SHEET 3.
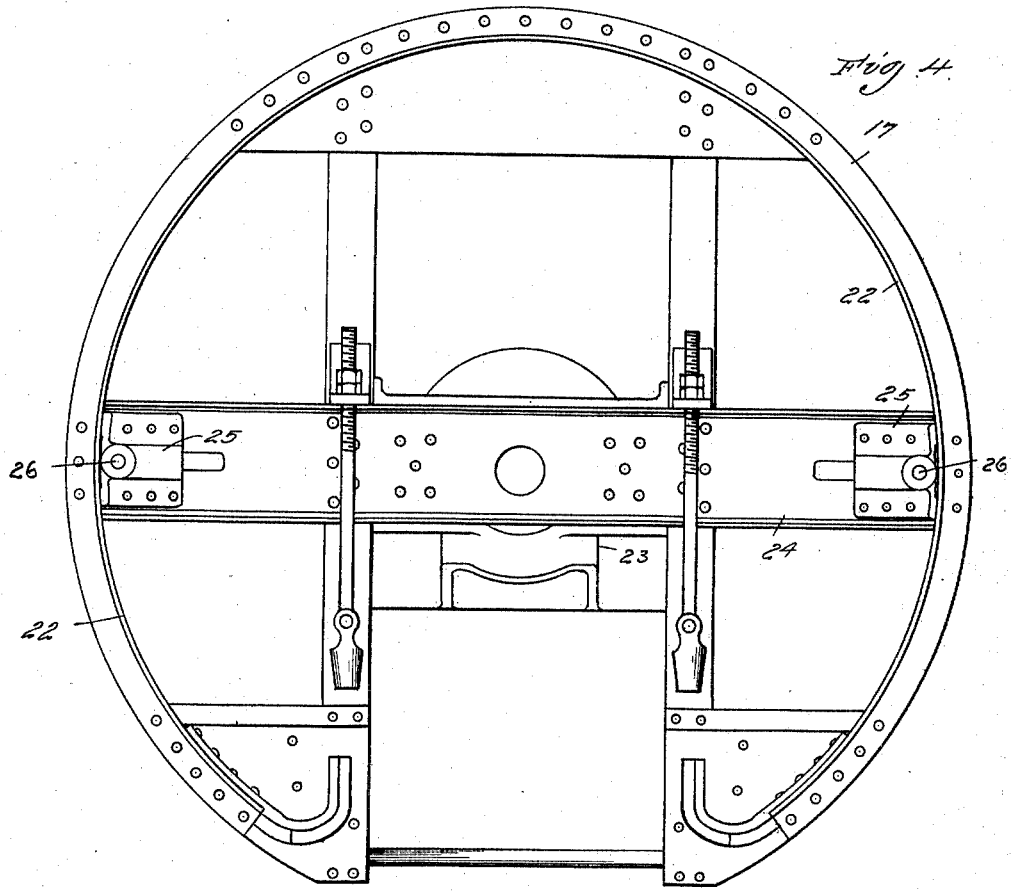
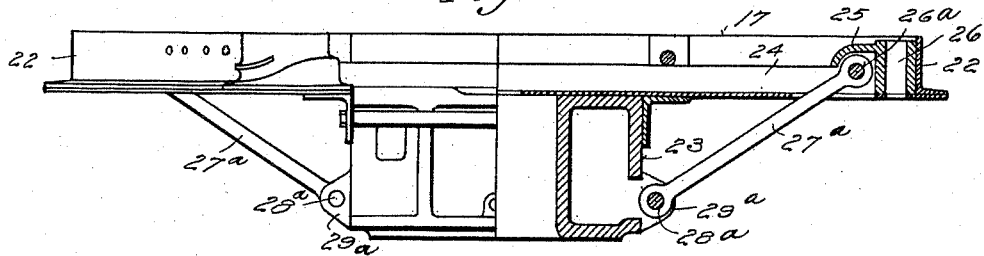
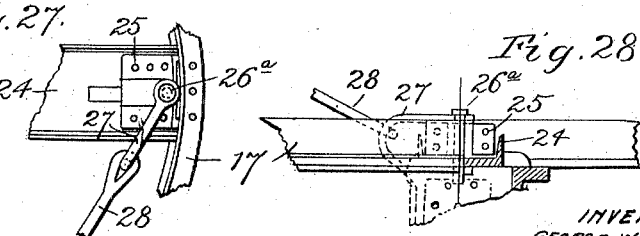
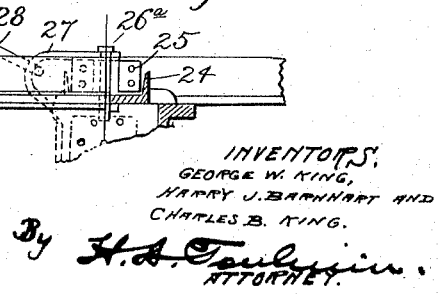
WITNESSES:
INVENTORS:
GEORGE W. KING,
HARRY J. BARNHART AND
CHARLES B. KING.
By
ATTORNEY

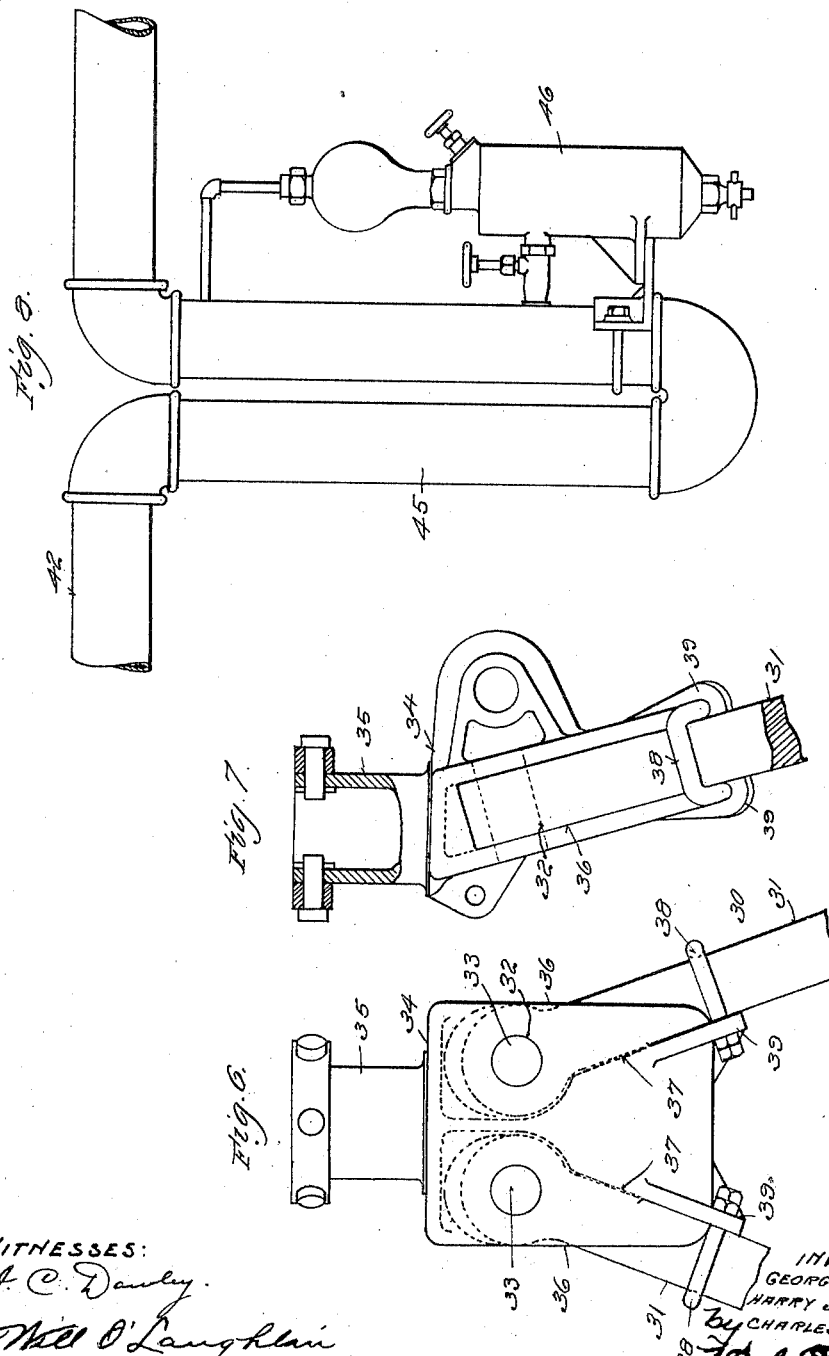

No. 760,456. PATENTED MAY 24, 1904.
G. W. KING, H. J. BARNHART & C. B. KING.
STEAM SHOVEL.
APPLICATION FILED SEPT. 29, 1902.
NO MODEL. 7 SHEETS—SHEET 5.
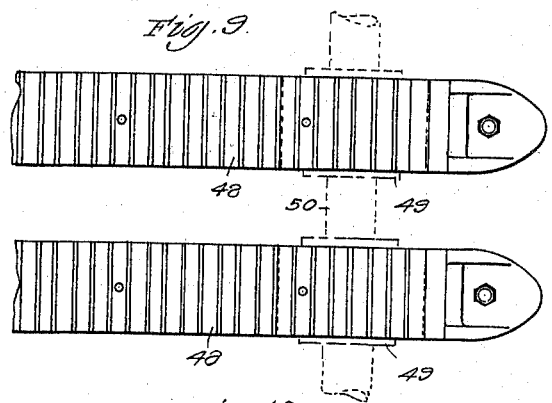
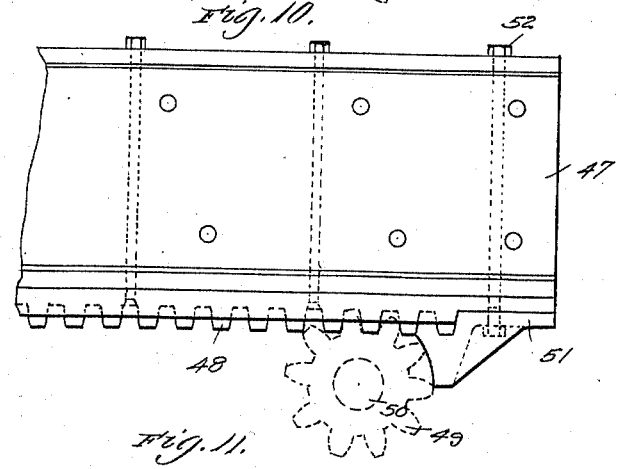
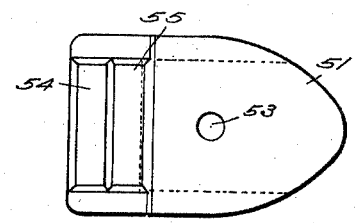
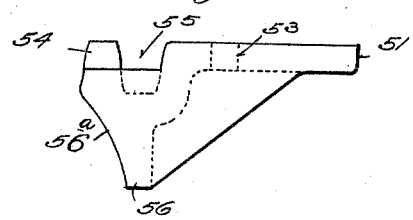

No. 760,456. PATENTED MAY 24, 1904.
G. W. KING, H. J. BARNHART & C. B. KING.
STEAM SHOVEL.
APPLICATION FILED SEPT. 29, 1902.
NO MODEL. 7 SHEETS—SHEET 6.
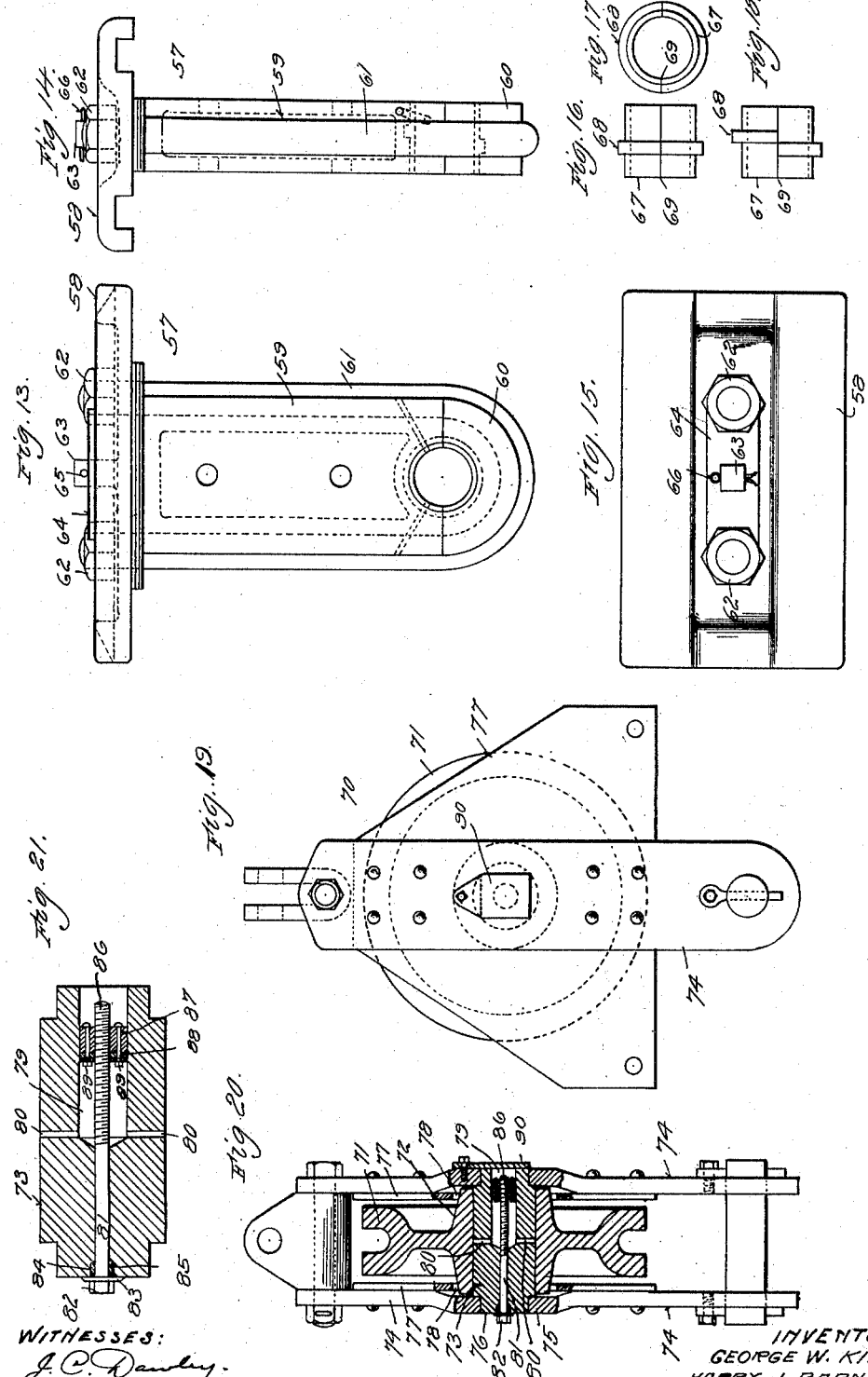
WITNESSES:
INVENTORS,
GEORGE W. KING,
HARRY J. BARNHART and
CHARLES B. KING.
By ATTORNEY.

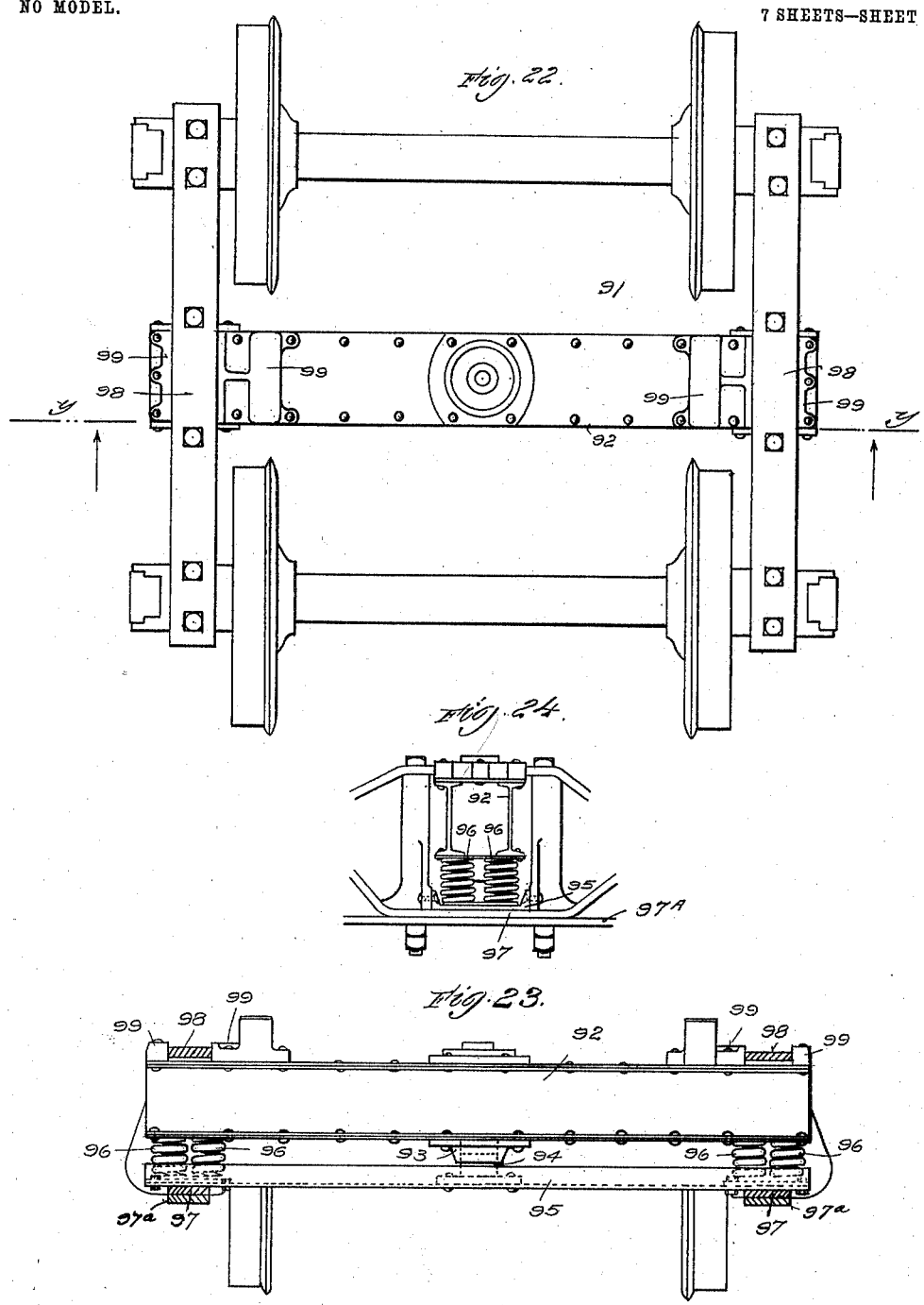

No. 760,456. Patented May 24, 1904.

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

STEAM-SHOVEL.

SPECIFICATION forming part of Letters Patent No. 760,456, dated May 24, 1904.

Application filed September 29, 1902. Serial No. 125,241. (No model.)

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Steam-Shovels, of which the following is a specification, reference being had therein to the accompanying drawings.

This invention relates to steam-shovels, and has for its object to provide an apparatus of this character having certain advantageous features of construction, which will be hereinafter more fully described.

To this end our invention consists in certain novel features, which we will now proceed to describe and will then particularly point out in the claims.

In the accompanying drawings, Figure 1 is a plan view of a steam-shovel embodying our invention in one form, certain parts being omitted. Fig. 2 is a side elevation. Fig. 3 is a detail sectional view taken on the line $x\ x$ of Fig. 1 and looking in the direction of the arrows. Fig. 4 is a plan view of the swinging circle. Fig. 5 is a front elevation of the same, one-half in central vertical section. Fig. 6 is a front elevation of the upper part of the A-frame. Fig. 7 is a side elevation of the same, partly in vertical section. Fig. 8 is a detail side elevation of a portion of the steam-supply pipe for the crowding-engine and the lubricator therefor. Fig. 9 is a view of the under or rear side of the upper end of the dipper-handle. Fig. 10 is a side elevation of the same. Fig. 11 is a detail view of one face of the dipper-handle stop. Fig. 12 is a side elevation of the same. Fig. 13 is a side elevation of the dipper-handle yoke detached. Fig. 14 is an end elevation of the same. Fig. 15 is a top plan view. Fig. 16 is a side elevation of the bushing of the yoke-block before the same is placed in position in the block. Fig. 17 is an end view of the same. Fig. 18 is a view similar to Fig. 16, showing the position of the parts when the bushing is in place in the block. Fig. 19 is an elevation of the dipper-bail sheave-block. Fig. 20 is a view of the same at right angles to Fig. 19 and partly in central vertical section. Fig. 21 is an enlarged view of a portion of Fig. 20. Fig. 22 is a plan view of one of the trucks. Fig. 23 is a sectional view of the same, taken on the line $y\ y$ of Fig. 22 and looking in the direction of the arrows. Fig. 24 is an end view of a portion of the truck. Figs. 25 and 26 are respectively a plan view and side elevation of a modified form of the swinging apparatus. Fig. 27 is a detail plan view illustrating the connection between the swinging circle and boom-brace; and Fig. 28 is a side elevation, partly in section, of what is shown in Fig. 27.

We will first refer to that portion of our invention which relates to the arrangement of the hoisting and swinging drums, their engines, and intermediate connections.

Referring more particularly to Figs. 1 and 2, 1 indicates a suitable car-body, on which is mounted a hoisting-drum 2, provided with a gear 3, which meshes with a pinion 4 on a shaft 5, which is the shaft of the hoisting-engines 6. These latter are arranged a sufficient distance apart to receive between them the swinging-engines 7, which drive, by means of a pinion 8 and gear 9, a counter-shaft 10, which is mounted in bearings 11, supported on the frames of the hoisting-engines 6. This counter-shaft is provided with a pinion 12, which meshes with a gear 13 on a shaft 14, which carries the swinging-drum 15 and which has its bearings 16 also supported on the frames of the hoisting-engines. By reason of this construction the hoisting and swinging engines and their drums are arranged compactly, so as to occupy a minimum of space, while at the same time all of the parts are easy of access.

The swinging circle, which is indicated as a whole by the reference-numeral 17, is operated by a cable 18 having its ends secured to the swinging circle, around the periphery of which they pass and are thence carried to the swinging-drum 15. Of course a single cable or two separate cables may be employed, as desired. Adjacent to the swinging circle, immediately in the rear thereof, are located the sister-sheaves 19 and 20, mounted on a suitable support 21 and having their peripheries closely adjacent to each other. By reason of this construction we are enabled to turn the swinging circle considerably more than one-half way around. It will be noticed that the swinging-drum 15 occupies an elevated position, and the sheave 19 is located with its axis vertical, so that it rotates in a horizontal plane and guides that part of the cable which passes around it to the under side of the swinging-drum 15, while the sheave 20 has its axis tilted forward, so that said sheave rotates in a downwardly and forwardly inclined plane and guides that portion of the cable 18 which passes around it to the upper side of the swinging-drum 15. This feature of the construction is shown more particularly in Figs. 1, 2, and 3.

The swinging circle is shown in detail in Figs. 4 and 5 of the drawings and embodies certain novel features of construction whereby it is materially strengthened. It consists, essentially, of a peripheral or rim portion 22, a central hub 23, and a transverse channel-bar 24, secured on top of the hub and having its ends secured to the annular rim 22. At each end of the channel-bar 24 there is secured thereon a block or casting 25, which forms an abutment for the vertical flange of the rim 22 and which is provided with a sleeve-like portion 26 to receive the securing pin or bolt 26ª of the clevis 27 of the brace 28, which extends from each side of the swinging circle to the boom 29. The points of connection of these braces to the boom being higher than their points of connection to the circle there is an upward strain upon the sides of the circle, which is resisted by the transverse channel-bar 24 and is further resisted by means of braces 27ª, secured at their upper outer ends to the castings or blocks 25 by means of pins or bolts 26ª, while their lower inner ends are secured by bolts or pins 28ª between lugs 29ª on the hub 23. By reason of this construction distortion of the circle under the strains exerted thereon by the boom is prevented.

The A-frame, indicated as a whole by the reference-numeral 30, is mounted on the body 1 in the usual manner; but it embodies in the structure of its upper portion or head certain features of material advantage. The legs 31 are provided at their upper ends with eyes 32, apertured for the passage of pins 33, by means of which they are connected to the head 34. This latter consists of a casting having the usual journal 35 at its upper end and provided with lateral recesses 36 in its lower portion or body, within which the upper ends of the legs 31 fit. These recesses are provided with downwardly-diverging bearing-surfaces 37, against which the inner sides of the legs 31 rest, and said legs are additionally held in position by means of clips 38, which unite them to the head-casting 34, near the bottom thereof. Preferably these clips are in the form of U-shaped bolts passing around the legs and through lugs 39 at the bottom of the head. It will be noted that the pins 33 are readily removable when necessary in case of repairs or the like and in connection with the clips 38 serve to prevent lateral motion of the parts when the load carried by the boom is swung to one side or the other. Since the head-casting projects down between the legs, it tends to prevent said head-casting from tipping from one side to the other; but with the assistance of the clips 38 it will be seen that when such a strain is brought upon the head-casting as to cause its lower end to press against the upper end of one of the A-frame legs the clip on the other side acts in tension, so that the strain of supporting the head in a vertical position is taken by both legs no matter in which lateral direction the strain is exerted.

In apparatus of this character it has heretofore been found difficult to properly lubricate the crowding-engines 40, located on the boom 29. This arises from the fact that the boiler 41 is located at the other end of the supporting body or car at a great distance from the crowding-engines and from the further fact that the pipe 42, which conveys the steam from the boiler to the crowding-engine, is provided with a vertical swivel-joint 43 in line with the center of the swinging table 17, so that it is necessary to locate the lubricating device which imparts the lubricant to the steam at a point between said swivel-joint and the boiler in order to lubricate said joint, as well as the crowding-engines. Heretofore it has been deemed necessary to locate the lubricator at a point close to the swivel-joint 43, for the reason that if located at a point nearer to the boiler the lubricant would not be carried by the steam a sufficient distance to lubricate the crowding-engines and swivel-joint. Furthermore, the tendency where all the engines are connected to one main supply-pipe is for the larger engines to draw the oil away from the smaller ones, and where the lubricator has been located near the boiler this has resulted in a further decrease in or prevention of the supply to the crowding-engines and the swivel-joint. On the other hand, when the lubricator is located close to the swivel-joint its position is so exposed that it is found impracticable to use the ordinary commercial lubricator. We overcome this difficulty by the construction shown more particularly in Figs. 2 and 8, in which the pipe 42, which supplies the crowding-engines with steam, is provided at a point comparatively close to the boiler or to its connection with the main steam-pipe 44 with a downwardly-extending U-shaped bend 45, to one member of which is connected the lubricator 46. By reason of this construction the lubricant will by the action of gravity settle to the bottom or depressed portion of the U-shaped bend, where it will accumulate in sufficient quantity to be forced by the action of the steam through the different bends and elevations of the pipe 42 to the swivel-joint and crowding-engines. By reason of this construction we are enabled to locate the lubricator in a position near the boiler where it will not be exposed and where the lubricant will be kept warm, while at the same time an efficient supply of lubricant is carried by the steam to the parts to be lubricated and the larger engines are prevented from drawing off the supply for the crowding-engines and the lubricant is prevented from flowing back by gravity, so as to travel in the wrong direction. We are also enabled in this way to employ the ordinary commercial lubricator.

The dipper-handle, indicated as a whole by the reference-numeral 47, is constructed in the usual way of two parallel members each provided on its under or rear side with a rack 48, these racks meshing with pinions 49 on a shaft 50, mounted on the boom 29 and driven by suitable gearing from the crowding-engines 40. In order to prevent the dipper-handle from being shoved out too far, we have provided for each rack a terminal stop at the upper end thereof comprising a plate 51, fitting against the under side of the dipper-handle at the end thereof and adapted to be secured in position by a single bolt 52, passing through the dipper-handle and through a suitable aperture 53 in the plate 51. This plate is provided with gear-teeth to engage the end teeth of the rack 48 and in conjunction with the bolt 52 hold the plate firmly in position on the dipper-handle. In the present instance we have shown said plate as provided with a gear-tooth 54 to fit between the last two teeth of the rack 48 and with a recess 55 adjacent thereto to receive the last tooth of the rack. In addition thereto the plate 51 carries a boss or projection 56, having a curved face 56ᵃ adapted to fit against the corresponding pinion 49 when the handle is moved to the limit of its motion in an outward and downward direction. It will be seen that the intermeshing gear-teeth of the rack and stop-plate receive the entire force of the end thrust of the meeting of the parts, so that the stop-plate may be readily held in place by a single bolt, thus facilitating its removal when not needed or when the handle is to be slipped into or out of place. A further advantage of this construction is that the stop comes into contact with the pinion where it can do the least damage. Heretofore stops have been employed which come into contact with the yoke-block, hereinafter referred to, such contact frequently resulting in serious breakage. The yoke-block, indicated as a whole by the reference-numeral 57, fits between the members of the handle and embraces the shaft 50, so as to hold the racks of the handle in mesh with the pinions 51. It comprises a head-block 58 and a body portion made in two parts 59 and 60 and united to the head-block by a yoke or U-shaped bolt 61, the ends of which pass through the head-block 58 and receive the nuts 62. Owing to the jarring strains to which the parts are subjected some form of nut-lock is necessary to prevent the nuts 62 from working loose, and it has heretofore been customary to place a locking-plate between the nuts and secure it to the head-block 58 by means of a bolt or screw. This bolt or screw will itself work loose in practice and the locking-plate will drop off, thus permitting the nuts to become loose. To obviate this objection, we employ a head-block having thereon a central projection 63, the locking-plate 64 having a corresponding aperture, through which said projection extends. The projection 63 is itself transversely apertured, as indicated at 65, to receive a key or cotter 66, which passes through said projection outside of the locking-plate 64 and serves to firmly hold said locking-plate in position and prevent it from jarring loose. In this way accidental loosening of the nuts 62 is effectually prevented.

Great difficulty has heretofore been found in providing a suitable bearing within the yoke-block for the shaft 50. A cast-iron bearing is found to cut out very rapidly, while a babbitted bearing will crush out, owing to the constant pounding of the dipper-handle. Brass bushings have heretofore been used; but they have been held in place by means of dowels, which is an expensive and unsatisfactory construction. To overcome this objection, we employ a brass bushing in the form of a sleeve 67, having formed on its exterior an annular rib 68, located nearer one end of the sleeve than the other. This sleeve is then split in two longitudinally, as indicated at 69, so as to divide it into two equal halves. The members 59 and 60 of the body of the yoke are bored out to fit the diameter of the sleeve 67 and are also provided with a groove or annular recess of a size corresponding to that of the rib 68. This groove is located a distance inward equal to the distance from the end of the sleeve to the rib 68. In assembling the parts one of the members 60 or 59 is turned end for end, and one of the two halves of the sleeve 67 is also turned end for end, as indicated in Fig. 18, and the halves are then placed in position between the members 59 and 60 of the body of the yoke-block. It will be seen that when the parts are thus assembled the ribs on the sleeve-sections will not only prevent the sleeve-sections from moving longitudinally, but will also prevent them from turning within the parts of the yoke-body, since the members are so reversed that the recesses in which the ribs fit extend only half-way around in each case. We have thus provided for a simple split brass bushing easily constructed, readily put into place, and securely held in position when in place.

The dipper sheave-block, (indicated as a whole in Fig. 2 by the reference-numeral 70,) is shown in detail in Figs. 19, 20, and 21. It comprises a sheave 71, having an elongated hub 72, which extends some distance in each direction beyond the sides of the rim of the sheave. The sheave is mounted on a bearing-pin 73, supported in a frame comprising side bars 74, which are bent out or deflected laterally at 75 to accommodate the extended hub of the sheave and the correspondingly-extended bearing-pin 73. By reason of this construction we obtain a hub of sufficient length to insure a proper bearing for the sheave. Preferably the bearing-pin 73 is provided with squared ends 76, which fit within corresponding apertures in the outwardly-deflected portions 75 of the side bars 74. In order to guide the chain and hold it properly in the grooved periphery of the sheave, guide-plates 77 are employed, secured to the inner faces of the side bars 74, so that they lie closely adjacent to the sides of the periphery of the sheave and maintain the chain in proper relation thereto. These guide-plates are provided with apertures 78, through which the ends of the hub 72 extend, and this construction enables us to set the guide-plates up close to the sheave, while at the same time the hub is given the desired length.

In order to properly lubricate the bearing-surfaces between the hub 72 and bearing-pin 73, we form within the pin 73 a cylindrical chamber 79, extending axially therein from one end and provided with radial passages 80, extending from said chamber to the periphery of the pin. Through the closed end of the pin there extends into the chamber a rod 81, turning loosely in the solid portion of the pin and provided at its exposed end with a head 82 and washer 83, and the pin being provided with a recess 84 and a packing 85 therein adjacent to said head and washer. That portion of the rod 81 which projects within the chamber 79 is threaded, as indicated at 86, and passes through a correspondingly-threaded nut or piston 87, fitting within the chamber 79 and provided with packing-disks 88, of leather or the like, secured thereto by bolts 89, the heads of which project into the interior of the chamber 79. A plate 90, pivoted to one of the side bars 74, serves as a closure for the open end of the chamber 79. The chamber 79 being supplied with a lubricating-grease, it will be seen that by rotating the rod 81 by means of its head 82 the nut or piston 87 may be drawn toward the closed end of the chamber, thereby forcing the grease out through the passages 80, so as to lubricate the bearing-surfaces between the sheave-hub and pin. The packings 85 and 88 prevent escape of the grease in any other direction, and the projecting nuts 89 extend into the grease to an extent sufficient in practice to prevent the piston or nut 87 from rotating when the rod 81 is turned in the manner described.

In the particular embodiment of our invention shown in Figs. 1 and 2 the steam-shovel illustrated is of that type adapted for use upon railways and is supported upon trucks, which are indicated as a whole by the reference-numeral 91. Such trucks, where they are used in connection with a steam-shovel of the character described, are subjected to lateral strains much greater than ordinary railroad-trucks, and for the purpose of adapting the trucks to better resist these strains we have devised the construction shown more particularly in Figs. 22 and 23. In this construction the truck-bolster (indicated at 92) is provided on its under side with a socket-casting 93, within which fits a projection 94, mounted on a channel-bar 95, which forms the spring-board of the truck, the springs 96 being interposed between said channel-bar and the bolster 92, at each end thereof. The lower arch-bars 97 and tie-bars $97^a$ pass underneath and are secured to the ends of the channel 95, while the upper arch-bars 98 pass over the top of the bolster 92, which latter is provided with projections or castings 99, secured thereon on each side of the upper arch-bars, so as to prevent lateral motion of the bolster relatively thereto. By reason of this construction the side thrust is taken by both the top and bottom arch-bars and tie-bars, and twisting of said bars is thereby prevented.

We do not wish to be understood as limiting ourselves to the precise details of construction hereinbefore described, and shown in the accompanying drawings, as it is obvious that these details may be modified without departing from the principles of our invention. For instance, we have shown in Figs. 25 and 26 a modified form of the cable connections between the swinging-drum and swinging circle. In this construction the swinging-drum $15^a$ is provided with a double groove, and the sister-sheaves $19^a$ and $20^a$ are also provided with double grooves. The swinging circle $17^a$ has corner-castings $17^b$, provided with double grooves, located one above the other, and its rim is sufficient in height to accommodate two cables lying one above the other. The adjusting-bolts $17^c$ are provided with equalizing-sheaves $17^d$, and the cables $18^a$ and $18^b$ pass around these equalizing-sheaves and around the corner-castings $17^b$, each cable being doubled and lying with one lead above the other against the periphery of the swinging circle. Each double cable also extends around its sister-sheave $19^a$ or $19^b$ and is led to the top or bottom of the swinging-drum, where its ends are made fast. By reason of this construction we are enabled to employ a smaller cable and secure increased flexibility thereof without losing strength. The diameters of the drums and pulleys are necessarily limited, and the smaller and more flexible cables will operate more satisfactorily over sheaves and drums of small diameter than a single cable of larger diameter.

We make no claim in the present application to the bearing herein described, and shown more particularly in Figs. 13, 14, 16, 17, and 18, as the same forms the subject-matter of a divisional application filed by us February 7, 1903, Serial No. 142,298, and patented May 26, 1903, No. 729,356. We also make no claim in this application to the truck herein described, and shown in Figs. 22, 23, and 24, as the same forms the subject-matter of a divisional application filed by us February 7, 1903, Serial No. 142,299, and patented April 14, 1903, No. 725,344.

Having thus fully described our invention, what we claim as new, and desire to secure by Letters Patent, is—

1. In a steam-shovel, the combination, with a body or support, of a hoisting-drum and separated engines therefor located thereon, swinging-engines located between the hoisting-engines, and a swinging-drum supported on the hoisting-engine frames, substantially as described.

2. In a steam-shovel, the combination, with a body or support, of a hoisting-drum mounted thereon, separated hoisting-engines having a common engine-shaft geared to the hoisting-drum, swinging-engines located between the hoisting-engines, and a swinging-drum and counter-shaft mounted on the hoisting-engine frames, substantially as described.

3. In a steam-shovel, the combination, with a swinging circle having a rim and hub, of a bar extending diametrically across the top of the hub to the rim and secured to the hub and rim, a boom, braces extending from the ends of the bar upward and forward to the boom, and other braces extending from the ends of the bar downward and inward to the hub, substantially as described.

4. In a steam-shovel, the combination, with a swinging circle comprising a rim and hub, of a diametrical channel-bar secured to said parts, a block or casting mounted on each end of said channel-bar, a boom connected to the circle, braces extending from the blocks or castings upward and forward to the boom, and other braces extending downward and inward from the blocks or castings to the hub, substantially as described.

5. In a steam-shovel, an A-frame comprising legs converging at their upper ends, a head-casting provided with recesses or sockets to receive the upper ends of the legs, and pins removably connecting said parts, substantially as described.

6. In a steam-shovel, an A-frame comprising upwardly-converging legs, a head-casting to which the upper ends of said legs are secured, said head-casting extending down and fitting between said legs, said legs being fastened at their upper ends to the head-casting, and the head-casting being provided at its lower end with clips, which hold said legs against the same, substantially as described.

7. In a steam-shovel, an A-frame having upwardly-converging legs, and a head-casting extending down between said legs and provided with sockets to receive the same, and bearing-surfaces for the adjacent sides thereof, pins passing through said head-castings and through the upper ends of the legs, and U-shaped clips removably secured to the lower end of the head-casting and embracing the respective legs to hold the same against the bearing-surfaces of the head, substantially as described.

8. In a steam-shovel, the combination, with a swinging boom and crowding-engines mounted thereon, of a boiler, a steam-pipe connecting the boiler and crowding-engines and provided with a downwardly-deflected or U-shaped portion, and a lubricator connected to said portion, substantially as described.

9. In a steam-shovel, the combination, with a swinging boom and crowding-engines mounted thereon, of a boiler, a steam-pipe connecting the boiler and crowding-engines and having a swivel-joint, said steam-pipe being provided with a downwardly-deflected or U-shaped portion adjacent to the source of supply of steam, and a lubricator connected to said portion of the pipe, substantially as described.

10. In a steam-shovel, the combination, with a dipper-handle provided with a rack, and a pinion meshing therewith, of a terminal stop therefor, comprising a plate secured to the same surface as the rack, adapted to engage the rack and provided with a stop projection to engage the pinion, substantially as described.

11. In a steam-shovel, the combination, with a dipper-handle and a rack secured to the under side thereof, of a terminal stop also secured to the under side of the dipper-handle at the end of the rack, the securing means consisting of a single bolt passing through the stop-plate and dipper-handle, said stop-plate being provided with a tooth and recess to engage the end teeth of the rack and having a stop projection to abut against the driving-pinion, substantially as described.

12. In a steam-shovel, a yoke-block comprising a head-block having an apertured projection, a body portion, a U-shaped yoke-bolt uniting the same to the head-block and provided with nuts on the outer side thereof, a locking-block fitting against said nuts and having an aperture for the passing of the head-block projection, and a key or cotter passing through the aperture in said projection on the outside of the locking-block, substantially as described.

13. In a steam-shovel, the combination, with a body or support, of a hoisting-drum and separated engines therefor located on said support, and swinging-engines and a swinging-drum located between the hoisting-engines, substantially as described.

14. In a steam-shovel, the combination, with a body or support, of a swinging circle, a swinging-drum, sister-sheaves located adjacent to each other and to the swinging circle at the rear thereof, said drum and sheaves being provided with double grooves, equalizing-pulleys mounted on the swinging circle, and double cables passing around said equalizing-pulleys and around the rim of the circle in opposite directions, said double cables passing around the respective sister-sheaves and to the upper and under sides of the swinging-drum, to which their ends are secured, substantially as described.

15. In a steam-shovel, the combination, with a body or support, of a swinging circle, a swinging-drum, guide-sheaves, said drum and sheaves being provided with double grooves, equalizing-pulleys mounted on the swinging circle, and double cables passing around said equalizing-pulleys and around the rim of the circle in opposite directions, said double cable passing around the respective guide-sheaves and to opposite sides of swinging-drum, to which their ends are secured, substantially as described.

In testimony whereof we affix our signatures in presence of two witnesses.

GEORGE W. KING.
HARRY J. BARNHART.
CHARLES B. KING.

Witnesses:
MARION O. STOLL,
ROBERT H. REIDENBAUGH.